April 25, 1933.  C. MACHEN  1,905,945
METHOD OF AND APPARATUS FOR SEPARATING SOLID CARBONACEOUS
MATERIAL FROM FOREIGN IMPURITIES
Filed Dec. 7, 1932  3 Sheets-Sheet 3
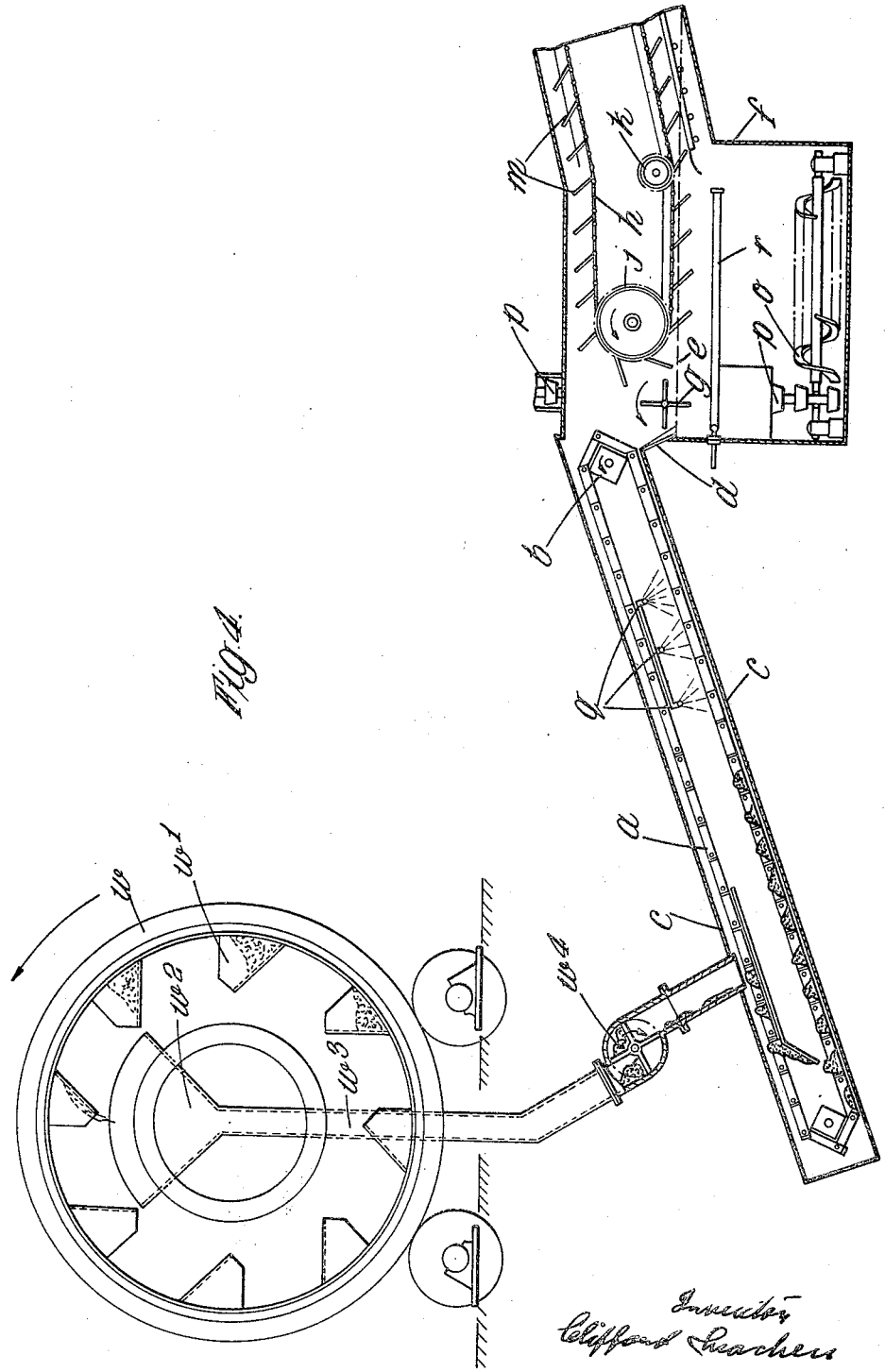

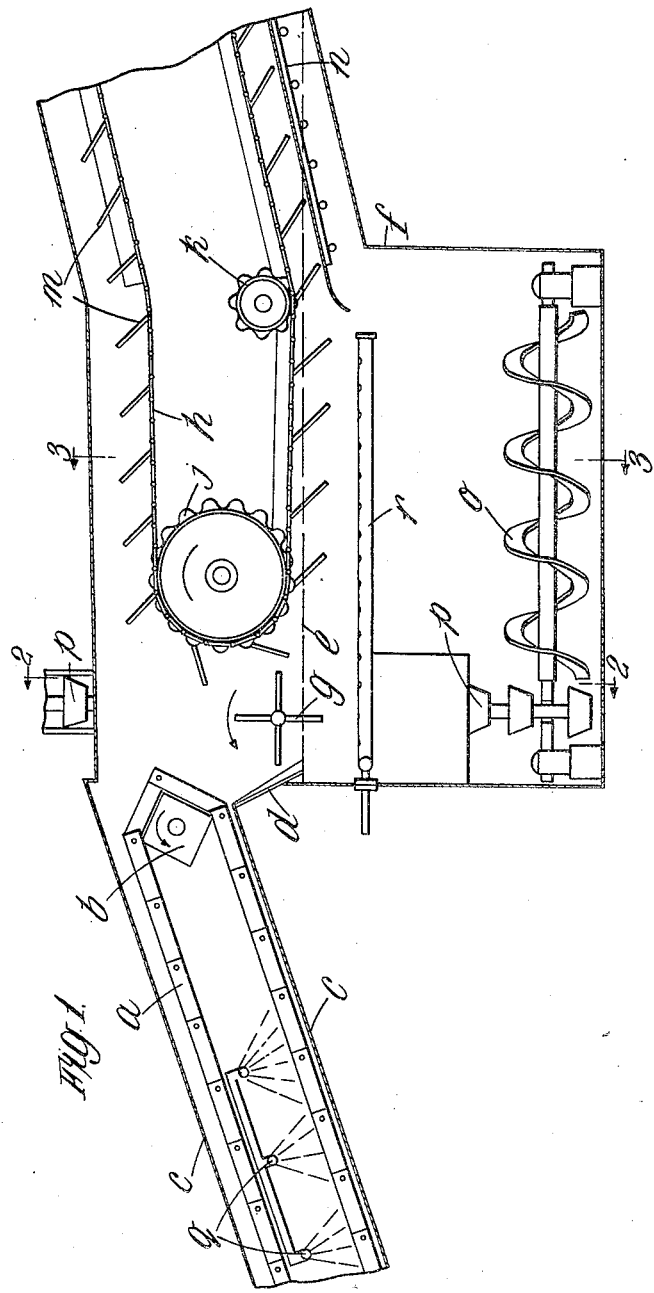

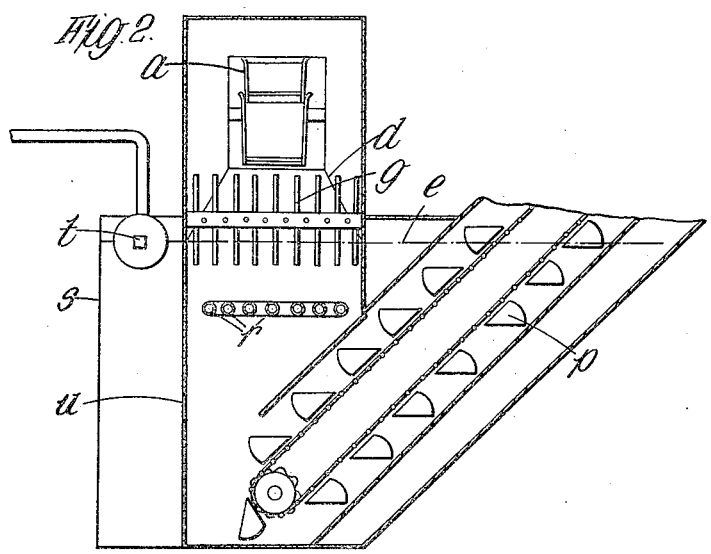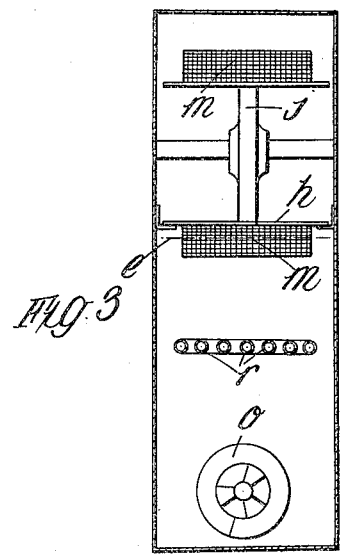

Patented Apr. 25, 1933

1,905,945

UNITED STATES PATENT OFFICE

CLIFFORD MACHEN, OF WESTMINSTER, ENGLAND, ASSIGNOR TO BRITISH COAL DISTILLATION LIMITED, OF LONDON, ENGLAND, A BRITISH COMPANY

METHOD OF AND APPARATUS FOR SEPARATING SOLID CARBONACEOUS MATERIAL FROM FOREIGN IMPURITIES

Application filed December 7, 1932, Serial No. 646,176, and in Great Britain August 7, 1931.

This invention relates to the separation or cleansing of solid carbonaceous materials from foreign impurities such as slate, shale, clay, or the like.

It has been discovered that if any solid carbonaceous materials, such as black bituminous coal or brown coal, especially when in the form of small coal or slack, is subjected to heat treatment, such as low, medium or high temperature distillation, so as to drive off from the carbonaceous materials a proportion or all of the volatile matter contained therein, there is a marked difference between the specific gravity of the impurity and the apparent specific gravity of the carbonaceous residue, this difference being due to the fact that, after volatile matter has been distilled or driven off from the original solid material, the carbonaceous residue which remains is porous and rendered more buoyant, while the cells are usually filled with gas. The impurities, on the other hand, are relatively unaffected by the heat treatment. By "apparent specific gravity" is meant the specific gravity of the distilled carbonaceous material including the cells of gas in contradistinction to the specific gravity of the original carbonaceous material per se prior to distillation or heat treatment.

According to the present invention solid carbonaceous material is first subjected to heat treatment so as to drive off from the carbonaceous material a proportion or all of the volatile matter contained therein, thus converting the carbonaceous material into a porous condition; the material, while still hot, is then moved for some distance over the surface of a relatively still liquid, such as water, which is maintained at constant level, the surface of the water being also maintained substantially at boiling point, so that the steam evolved assists in giving buoyancy to the porous carbonaceous material while also preventing it becoming water logged. The impurities thereupon sink, while the carbonaceous material continues to float and is removed from the surface of the water preferably while the carbonaceous material is still in a heated condition. The deposited foreign impurities, such as slate, shale, clay or the like, are removed separately from the bottom of the liquid container.

If desired, the buoyancy of the carbonaceous material may be enhanced by the liberation beneath the surface of the water of streams of air bubbles or the like which serve also to distribute and break up the fuel on the surface of the water.

By suitable regulation of the counter-current of air (if employed) beneath the surface of water, the percentage of carbonaceous material or intermediates associated with the impurities can be controlled effectively, and a quenched fuel of predetermined ash content obtained.

The water upon the surface of which separation takes place should be retained at substantially constant level, and to this end, the supply to the tank or container within which the process is carried on is led in in such a manner as to obviate any disturbing currents so that the surface layer of water or other liquid on which the hot fuel falls is always maintained at boiling point, and therefore generates readily the steam which assists in giving buoyancy to the particles of fuel.

It has also been found that the steam generated by the contact of the hot fuel with the water or other liquid attaches itself more readily to the more porous carbonaceous material than to the comparatively smooth surface of the slate, shale, clay or other impurities, with the result that the buoyancy of the former is further increased much more than that of the latter. Before being passed to the surface of the water the red hot carbonaceous material resulting from distillation or heat treatment may be sprayed with a fine spray of water or waste effluent liquid, the volume of water supplied in the form of a spray being so regulated that the fuel is cooled only to a point where the total vaporization of the spraying liquid is ensured and no liquid in vapour form remains to enter the cells of the fuel.

The effect of this preliminary cooling of the fuel from a high temperature to a lower, for example, from 400° C. to 150° C., is to reduce the amount of liquid which is drawn into the cells of the material which is being distributed over the surface of the liquid, as the cells are already filled with cooled gas which contracts little on coming into contact with the liquid at substantially 100° C.

After being moved for a certain distance over the surface of the liquid (the distance being determined by the nature of the material which is being handled and the character of the impurities contained therein), the floating carbonaceous residue is lifted from the surface of the liquid, for example, by means of an endless conveyor or the like, which may be provided with perforated or gapped blades adapted to dip beneath the surface of the water. Said conveyor may be adapted to travel parallel with the surface of the water for a certain distance and then upwardly so as to remove the material from the tank. In some cases an inclined sieve or the like may be provided and associated with the upper inclined portion of the conveyor. The perforations or gaps of the blades of the endless conveyor and the inclined sieve serve to prevent excessive water being carried up with the quenched material, thus leaving the same in a reasonably dry condition. It is desirable that the said sieve should be wedge-shaped. The separated impurities may be removed from the tank in any desired manner, for instance, by a screw conveyor associated with a bucket elevator. If desired, the blades of the conveyor for carrying the buoyant fuel over the surface of the water may be of scoop formation, but spaced apart from the conveyor (i. e., they may be constituted by bottomless perforated buckets) so that whilst they dip into the water, yet, when they move upwards around a sprocket wheel or the like at one end of the apparatus, the material picked up thereby will fall through the open bottom of the scoops. When such scoops are employed the use of a sieve becomes unnecessary.

A layout of a plant suitable for carrying on the present invention, is illustrated diagrammatically in the accompanying drawings, in which, Figure 1 is a side elevation, and Figures 2 and 3 are sections on the lines 2—2 and 3—3 respectively of Figure 1:

Figure 4 is a view similar to Figure 1, but containing the additional disclosure of a rotary retort within which carbonaceous material undergoes heat treatment or distillation in a well known manner.

The apparatus comprises an endless conveyor $a$ consisting of a series of side links and cross bars passing over a drum such as $b$ arranged to carry residual material or fuel from the discharge end of a rotary retort $w$ through the enclosed passage $c$ and deliver it onto a chute $d$ leading to the surface $e$ of water in a tank $f$. Adjacent to the chute $d$ is a slowly rotating paddle $g$ consisting of two sets of thin steel rods passing through and secured to a driving shaft. The distance between the rods of a set varies according to the size of the fuel to be treated. The ends of these rods pass several inches below the surface $e$ of the water in the tank $f$ and have the effect of opening out the bed of fuel floating on said surface, thus assisting the precipitation of the shale or foreign matter and materially improving the efficiency of separation.

The rotary retort $w$ is provided with scoops $w'$, which, in well known manner, lift the red hot coke from the lower end of the rotary retort and discharge the same into a hopper $w^2$, from which the material passes through a tube $w^3$ and rotary coal valve $w^4$ into the said endless conveyor A.

In the tank $f$ and above the surface $e$ of the water is an endless conveyor $h$ driven by a sprocket wheel $j$ and cooperating with a guide wheel $k$ so that part of said conveyor extends parallel with said surface $e$. This conveyor is provided with perforated or gapped blades $m$, $m$ set at an angle to the direction of movement so that as they pass over the sprocket wheel $j$ and approach the surface $e$ of the water, the edge of each blade is presented to said surface with the result that the tendency to press the floating fuel under the water is less than would be the case if the flat surface of the blade were presented to the surface of the water. The guide wheel $k$ is so situated that the blades $m$, $m$, carry the fuel along the surface $e$ for a predetermined distance and the inclination of said blades to the direction of movement has a lifting effect on said fuel thus reducing the tendency to the fuel to be depressed and "wetted" by the movement of the blade. After passing the guide wheel $k$ the blades $m$, $m$, carry the floating fuel up on to a sieve $n$ of wedge wire and thence out of the apparatus. The shale or other foreign matter sinks to the bottom of the tank $f$ where it is collected by a screw conveyor $o$ and delivered to a bucket elevator $p$ by which it is conveyed out of the apparatus.

Within the enclosed passage $c$ is arranged a series of jets $q$, $q$, by which a fine spray of water (or waste effluent) is applied to the fuel at full heat before it is distributed over the surface $e$ of the water in the tank $f$ such spray being so regulated that the fuel is cooled only to a point where the total vaporization of the spray water is ensured and no water in liquid form remains to enter the cells of the fuel. The effect of this preliminary cooling of the fuel from a high temperature to a lower (for example from 400° C. to 150° C.) is, as aforesaid, to reduce the amount of water which is drawn into the cells of the fuel on being distributed over the surface $e$ of the water in the tank $f$, the cells being filled already with cooled gas which contracts very little on coming into contact with the water at substantially 100° C. The buoyancy of the fuel may be enhanced also by the liberation beneath the surface of the water of streams of bubbles of air or the like which serve also to distribute and break up the fuel on the surface e. For this purpose a series of perforated pipes r, r, may be arranged as shown in Figures 1, 2 and 3, and connected with a suitable source (not shown) of air under pressure.

In order to retain the water in the tank f at substantially constant level and in order to prevent the supply of additional water from creating any disturbing currents which would prevent the layer of water on which the hot fuel falls being always maintained substantially at boiling point, such supply is led into a subsidiary tank s through a ball cock t, the subsidiary tank s communicating with the main tank f by way of an aperture u well below the level of said surface e.

I claim:

1. The method of separating solid carbonaceous material from foreign impurities such as slate, shale, clay or the like, which comprises subjecting the material to heat treatment so as to drive off at least a portion of the volatile matter contained therein, thus converting the carbonaceous material to a porous condition; moving the hot porous material over a relatively still body of liquid maintained at a substantially constant level; maintaining the surface liquid substantially at the boiling point, whereby gases evolved assist in giving buoyancy to the porous material and prevent said material becoming saturated with liquid; permitting the impurities to sink in said body of liquid while floating said carbonaceous material; and removing the carbonaceous material from the surface of the liquid while in a heated condition.

2. The method of separating solid carbonaceous material from foreign impurities such as slate, shale, clay or the like, which comprises subjecting the material to heat treatment so as to drive off at least a portion of the volatile matter contained therein, thus converting the carbonaceous material to a porous condition; spraying the heated porous carbonaceous material with a controlled volume of aqueous liquid, whereby at least some of the cells of the porous material become filled with steam and the gas previously disposed in said cells is prevented from contracting, and the material is rendered resistant to saturation by liquid; moving the material over a relatively still body of liquid maintained at a substantially constant level; permitting impurities to sink in said body of liquid while floating said carbonaceous material; and removing the carbonaceous material from the surface of the liquid while in a heated condition.

3. The method of separating solid carbonaceous material from foreign impurities such as slate, shale, clay or the like, which comprises subjecting the material to heat treatment so as to drive off at least a portion of the volatile matter contained therein, thus converting the carbonaceous material to a porous condition; moving the hot porous material over a relatively still body of liquid maintained at a substantially constant level; maintaining the surface liquid substantially at the boiling point whereby gases evolved assist in giving buoyancy to the porous material and prevent said material becoming saturated with liquid; increasing the buoyancy of the material and assisting the flotation thereof by liberating streams of a gaseous medium beneath the surface of the body of liquid at substantially the point where the material begins its movement over the surface of the liquid; permitting the impurities to sink in said body of liquid while floating said carbonaceous material; and removing the carbonaceous material from the surface of the liquid while in a heated condition.

4. The method of separating solid carbonaceous material from foreign impurities such as slate, shale, clay or the like, which comprises subjecting the material to heat treatment so as to drive off at least a portion of the volatile matter contained therein, thus converting the carbonaceous material to a porous condition; depositing the material onto the surface of a relatively still body of liquid maintained at substantially constant level to quench the material; moving the material over said surface and permitting heavy impurities to sink in said body of liquid while floating the carbonaceous material; removing the material from said body of liquid while said material still contains sufficient heat to vaporize excessive liquid removed therewith, thereby leaving the material in a substantially dry condition.

5. An apparatus for separating impurities from carbonaceous materials, comprising, in combination, means for preheating the material to drive off at least a portion of the volatile matter contained therein and to convert the material to a porous condition, a tank containing a liquid medium maintained at a substantially constant level, a casing for said tank enclosing the space above the liquid therein and having inlet and outlet conduits communicating with said space, a conveyor in the inlet conduit connecting the preheating means and said tank and adapted to deliver material to be separated to said tank, spray means in said conduit above said conveyor adapted to wet and preliminarily cool the heated material, a rotary paddle disposed in said casing adjacent the discharge of said conveyor and positioned to dip into said liquid medium and deposit the material gently onto the surface and arranged to move the same therethrough, a second conveyor in said casing positioned to engage material floating on the surface of said liquid when discharged from said paddle and arranged to convey the material through the tank, said second conveyor extending into the outlet conduit to convey the carbonaceous material therethrough, and means in the bottom of said tank for removing impurities which sink thereto.

6. An apparatus for separating impurities from carbonaceous materials, comprising, in combination, means for preheating the material to drive off at least a portion of the volatile matter contained therein and to convert the material to a porous condition, a tank containing a liquid medium maintained at a substantially constant level, a casing for said tank enclosing the space above the liquid therein and having inlet and outlet conduits communicating with said space, a conveyor in the inlet conduit connecting the preheating means and said tank and adapted to deliver material to be separated to said tank, spray means in said conduit above said conveyor adapted to wet and preliminarily cool the heated material, a rotary paddle disposed in said casing adjacent the discharge of said conveyor and positioned to dip into said liquid medium and deposit the material gently onto the surface and arranged to move the same thereover, a second conveyor in said casing positioned to engage material floating on the surface of said liquid when discharged from said paddle and arranged to convey the material through the tank, gas discharge means below the surface of said liquid under said second conveyor adapted to assist flotation of said material, said second conveyor extending into the outlet conduit to convey the carbonaceous material therethrough, and means in the bottom of said tank for removing impurities which sink thereto.

In testimony whereof I have affixed my signature.

CLIFFORD MACHEN.